(No Model.) 4 Sheets—Sheet 1.

N. B. FASSETT.
MACHINE FOR COUPLING CHAIN LINKS.

No. 377,376. Patented Feb. 7, 1888.

Witnesses:
J. E. Turner
J. L. Doubleday

Inventor:
Nelson B. Fassett,
Doubleday & Bliss,
atty.

(No Model.) 4 Sheets—Sheet 2.
N. B. FASSETT.
MACHINE FOR COUPLING CHAIN LINKS.

No. 377,376. Patented Feb. 7, 1888.

Witnesses:
J. C. Turner
J. L. Doubleday.

Inventor:
Nelson B. Fassett.

(No Model.) 4 Sheets—Sheet 3.
N. B. FASSETT.
MACHINE FOR COUPLING CHAIN LINKS.
No. 377,376. Patented Feb. 7, 1888.
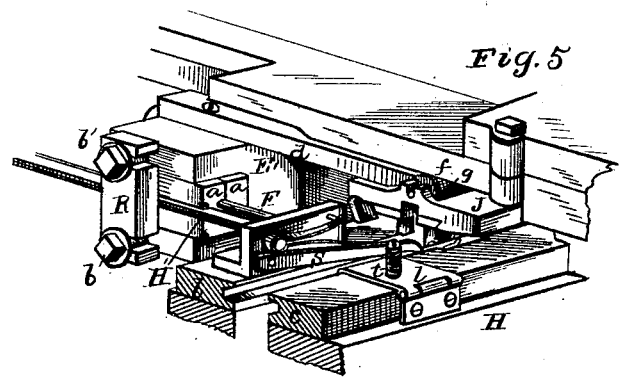
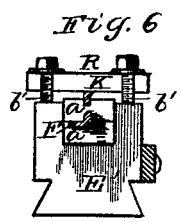
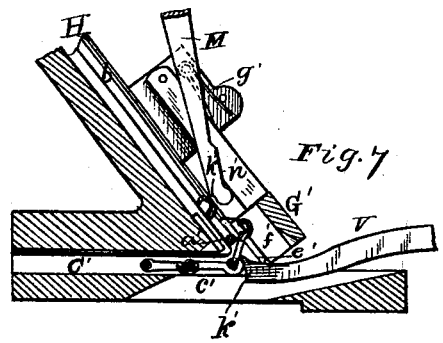
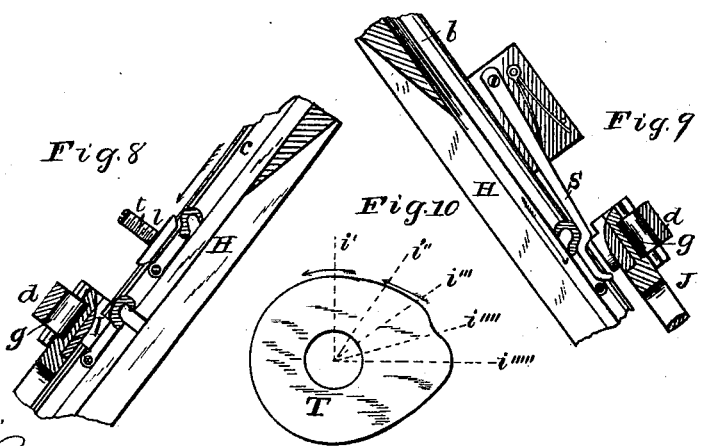
Witnesses: Inventor:

(No Model.) 4 Sheets—Sheet 4.
N. B. FASSETT.
MACHINE FOR COUPLING CHAIN LINKS.
No. 377,376. Patented Feb. 7, 1888.
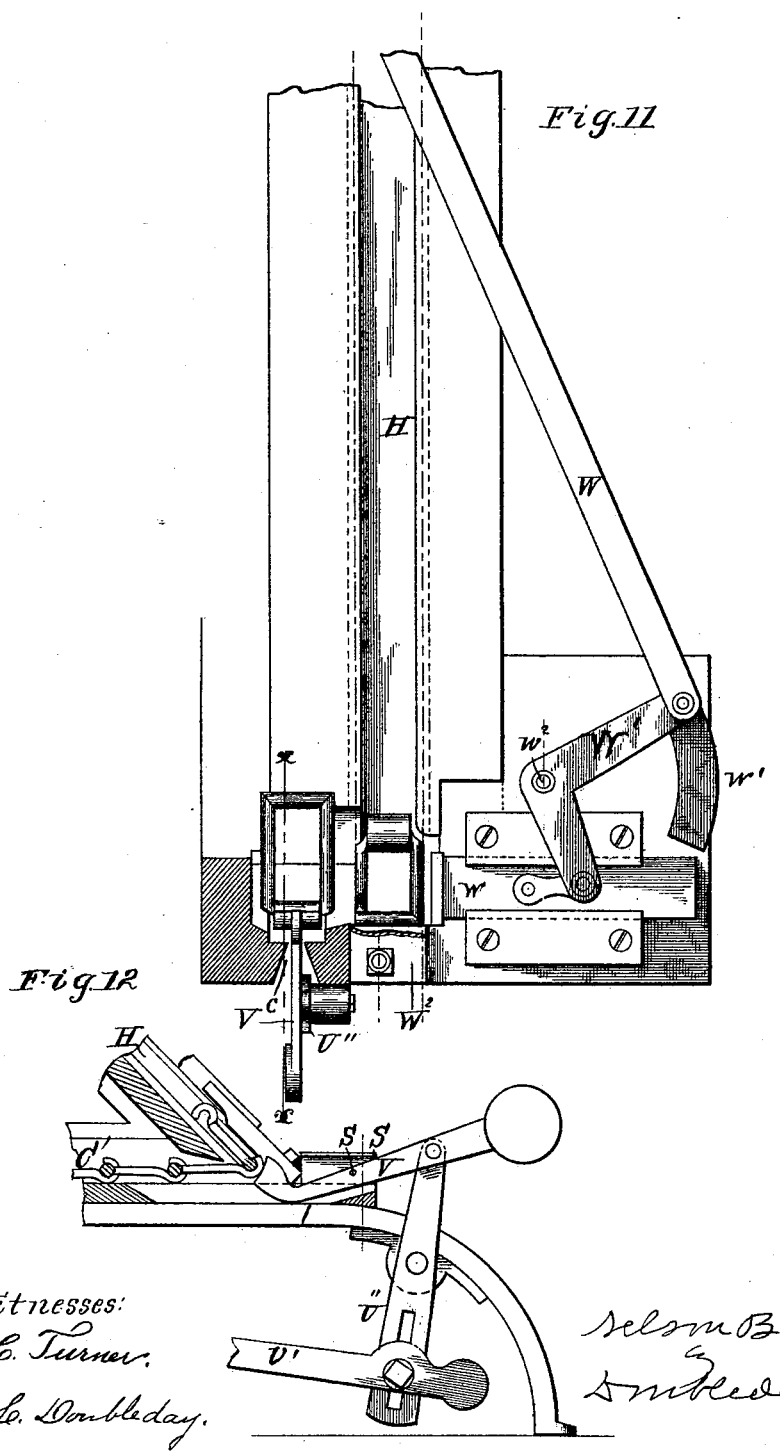

UNITED STATES PATENT OFFICE.

NELSON B. FASSETT, OF MOLINE, ILLINOIS.

MACHINE FOR COUPLING CHAIN-LINKS.

SPECIFICATION forming part of Letters Patent No. 377,376, dated February 7, 1888.

Application filed November 19, 1886. Serial No. 219,375. (No model.)

*To all whom it may concern:*

Be it known that I, NELSON B. FASSETT, a citizen of the United States, residing at Moline, in the county of Rock Island and State of Illinois, have invented certain new and useful Improvements in Machines for Coupling Chain-Links, of which the following is a specification, reference being had therein to the accompanying drawings.

The present invention has for its object to provide a machine by which the separate links of flat or drive chains can be assembled together in and by such machine, thereby avoiding the necessity and slow method of putting the links together by hand to complete the chain ready for market, which hand-labor necessarily involved considerable expense to the manufacturer.

Figure 1:
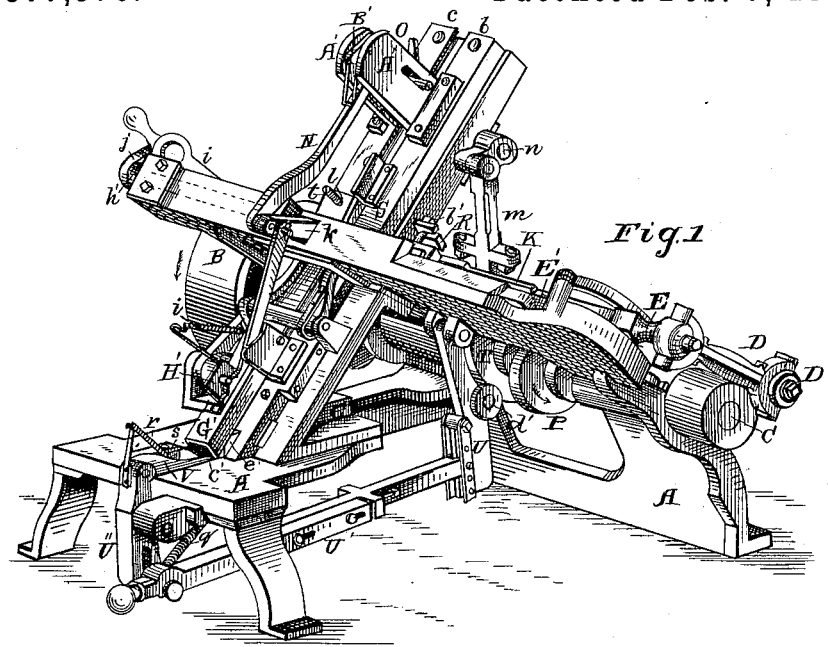
Figure 2:
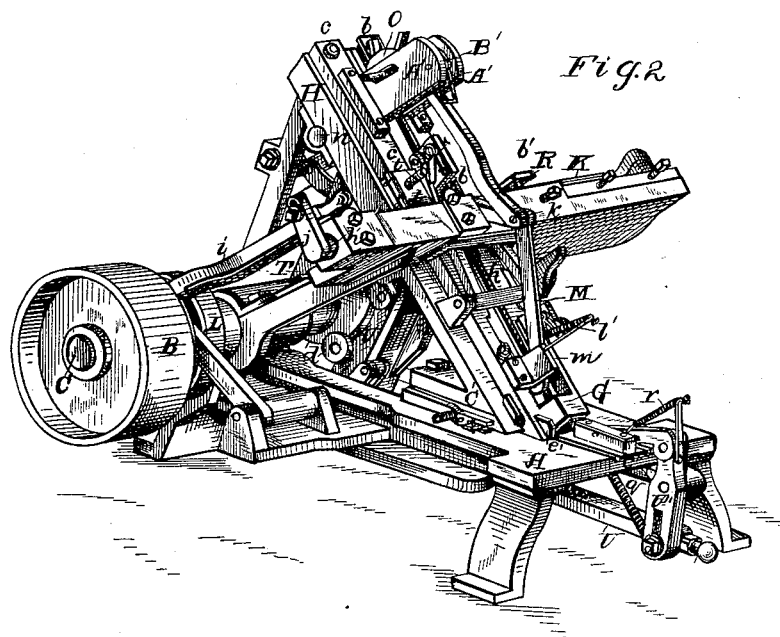
Figure 3:
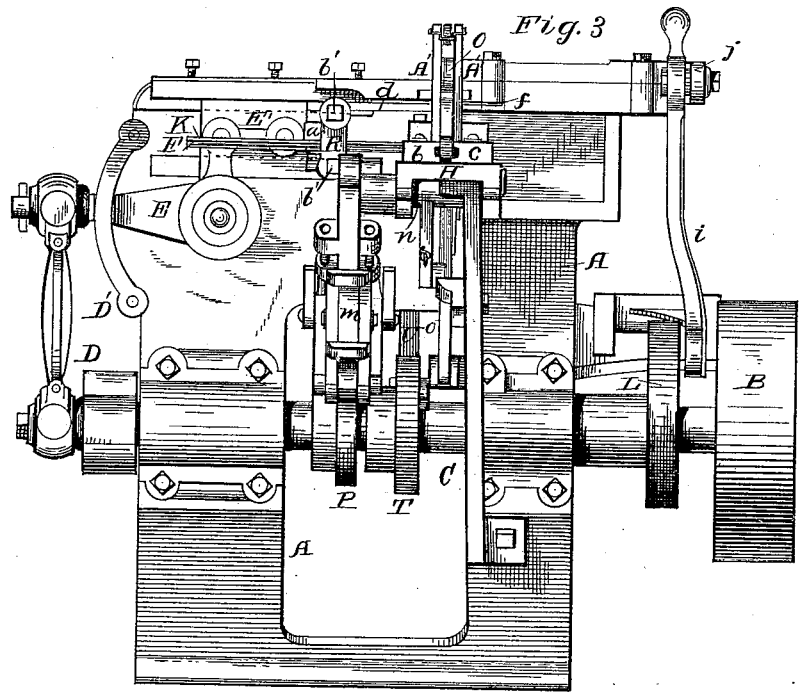
Figure 4:
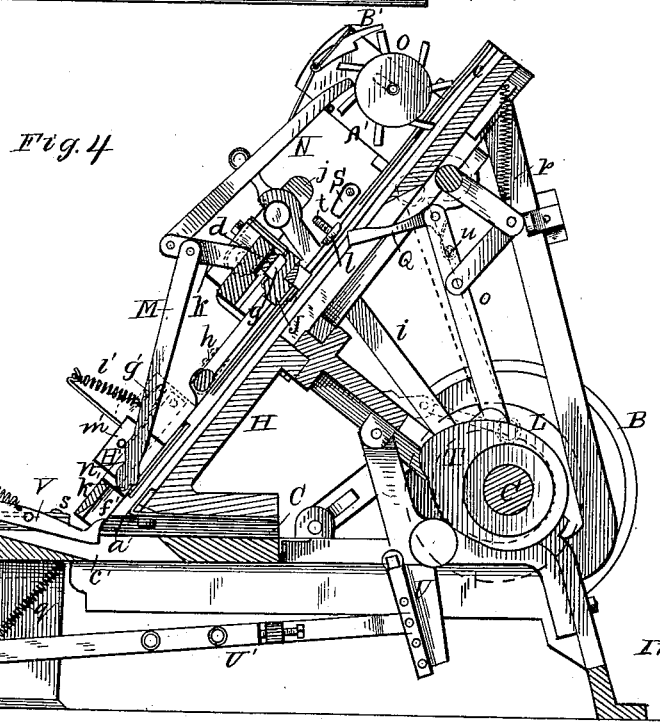

Figure 1 of the drawings is a perspective view of the machine; Fig. 2, a similar view taken from the side opposite to that of Fig. 1; Fig. 3, a rear end view of the machine; Fig. 4, a vertical section thereof; Fig. 5, a detail view in perspective and on an enlarged scale, showing the clamping device, spring friction-latch, and the carriage with the trimmer and the drift device connected thereto. Fig. 6 is an end view of the carriage and its attachments; Fig. 7, a detail sectional view of the lower end of the chute and chain channel or guideway, the link-coupling device and thrust-bar being shown in position, and also the links in position for coupling; Fig. 8, a detail sectional perspective view of the link-channel of the chute showing the links held in position by the clamp device and the spring-latch; Fig. 9, a detail view showing the check-bar in position under the clamp device and on the link, and Fig. 10 a plan view of the variable cam. Fig. 11 is a partial plan view of a modification partly broken away. Fig. 12 is a partial vertical section taken on line $xx$, Fig. 11.

In the accompanying drawings, A represents the main frame of the machine, and B the driving wheel or pulley carrying the main shaft C, with its crank D and pitman D'. An oscillating elbow, E, drives a reciprocating tool slide or carriage, E', to which it is pivotally connected, said carriage being adapted to receive the drift device F and sprue-trimmer K, the former of which is suitably clamped between the faces of two parallel blocks, $a$, shaped to fit the opposite sides of the drift device, so as to hold it in place, as shown in Fig. 6. The sprue-trimmer is seated in a groove in the upper one of the blocks $a$, and rests under the tool-holder R, all of which are clamped tightly together by the screws $b'$, or other convenient means.

When the main shaft C is revolved, the carriage E' will have imparted to it, by means of the crank-and-pitman connection D D', respectively, and the elbow E, a reciprocating movement, and with it the trimmer K and drift device F, which pass through a transverse opening in the guide-bars $b$ $c$ of the feed-chute H. The drift device F passes through the transverse opening, as above stated, and as it comes in contact with the link sizes or clears the hook thereof, (sizing it only when too small,) while the trimmer K removes any surplus matter of the sprue. The projecting flange on the drift device F, as shown in Fig. 6, shaves and smooths off all irregularities, fins, or ragged projections at the end of the hook to the required length, to let the cross-bar of the entering link readily couple therewith.

The drift device may be of any desirable shape to adapt itself to the form and style of link to be operated upon, and the one shown may be replaced by a drift especially adapted to the Ewart link, and in shape to conform to that of the interior of the hook of such links. While the link is being thus operated upon it is held firmly in position by the clamp I, which is pressed down upon the side bars of the link by means of an actuating device, consisting, preferably, of a wedge, $d$, connected to the tool-carriage E', whereby it has imparted to it a transverse reciprocatory movement. This wedge is forced in between a spring, $f$, and the friction-roller $g$, the former being connected to the frame of the machine and the latter to the upper side of a pivoted clamp-holder, J, which may be of any desirable form and construction.

The main shaft C of the machine is provided with a suitable cam, L, by the revolution of which a rocking motion is imparted to the shaft $h'$ through the medium of the connecting-bar $i$ and grooved or slotted crank $j$. At the opposite end of the shaft $h'$ is a crank, $k$, which dictates the time and motion of a link-coupling device, M, and a push-bar, N. The coupling device is employed to force a coupling of the links together at the lower end of the feeding-chute or link-guide H, and the push-bar periodically turns the sprocket or delivery wheel O. I prefer to term the wheel a "delivery wheel or device," and it may be variously modified, so long as the object to be attained is accomplished—viz., that of forcing the links down the channel of the feeding-chute, should they stick or from any cause hesitate to descend by gravity, and delivering them to a suitable friction-latch, l.

The delivery wheel or device O in the present case has its bearings in suitable brackets, A', its journals extending through elongated slots in the sides of said brackets to admit of the wheel yielding upwardly when found desirable. A spring-pawl, B', of any suitable form, is pivoted between the brackets A' to prevent the wheel or delivery device O from turning in the wrong direction, as shown in Fig. 4. A cam, P, on the main shaft C imparts a timed movement up and down to the adjustable connecting-rod m, and this in turn oscillates the double-crank shaft n, which imparts a forward and backward movement to the pivoted lever o. To the upper end of the lever o is pivoted the link-feeder Q, which is carried along nearly horizontally back and forth in the feeding-chute H, the outer or free end of the feeder hooking on or engaging with the lower cross-bar of the link, which is located under the spring-latch l. The feeder Q in its forward movement forces the link down obliquely in the link-channel of the chute H to a point directly under the clamp I, and there leaves it, it being caught and held in this position by the curved end of the check-bar S, wedging in between the two end bars of the link, as shown in Fig. 9. The return motion of the link-feeder Q is imparted by the coil or other form of spring P in time for feeding down the next link in the series. The cam T on the main shaft C imparts a timed movement to the lever U, the variable chain-bar U', and the adjustable lever U'', and, lastly, to the thrust-bar V, the motion being returned to the cam by the spring q, and the thrust-bar kept up to its work by a spring, r, while a pin, s', projecting from one side of the thrust-bar under the flange on the stop s, prevents the thrust-bar from being lifted too high by the spring which is attached thereto. In this manner a timed and intermittent movement of the chain in its channel or guideway is kept up, the object thereof being to push the chain ahead the space of one link at every revolution of the main shaft.

As the first link is introduced into the link-channel of the chute by the hand of the attendant, the link slides down the channel until the back of the hook strikes the friction spring-latch l, where it is arrested by the flanged end of the latch being pressed down upon it by the action of the coiled spring t, said link being arrested far enough above the link under clamp to allow the sprue-trimmer K to pass through and trim said link under clamp, as shown in Fig. 8. By this means the first link supplied to the machine is arrested on its downward passage and the succeeding links are stopped by this first link, and so on until the link-channel of the chute above the stop is supplied with the separate links. While the first link is thus resting under the spring-latch l the machine is set in motion.

The friction spring-latch I prefer terming an "arresting device," as the form of device shown is one of many forms that may be employed to arrest the descent of the link in the channel of the chute, for the purpose hereinbefore stated. Starting with one link resting under the arresting device l, and the link-feeder Q still hooked upon the lower cross-bar of the link, one of the first moves made by the revolving of the main shaft C and cam P is responded to by the spring p drawing the link-feeder backward out of the way, and the spring u (shown in dotted lines, Fig. 4) throwing the outer end of the feeder up, so that the hooked end thereof may engage the cross-bar of the next link above, now under the arresting device l, and be in readiness to bring this link down at the proper time. Continuing the rotary motion of the shaft C, the crank D, pitman D', and elbow E produce a forward movement of the tool-carriage E', which carries the drift device F and sprue-trimmer K, horizontally through and past the hook of the link, respectively, the link, when thus operated upon to dress it, being under the clamp I and held thereby. Upon the return movement of the drift device and trimmer, after the link has been drifted and trimmed, or, in other words, dressed, the link is released from the clamp by the withdrawal of the wedge or actuating device d, and afterward slides down to the lower end or bottom of the link-channel of the chute H. If this should be the first link down in the link-channel of the chute, it would be preferable to stay the action of the thrust-bar V for a few moments and let the lower link-channel partially fill with accumulated links. This is done by simply pressing the thrust-bar V down with the thumb, so as to let it thrust under the link at the bottom of the link-channel a few times, when, by removing the thumb, the thrust-bar will seize the lower cross-bar of the link lowermost in the link-channel and push the lower end of the link endwise into the chain channel or guideway C', the fulcrum-corner a' forcing the upper end of the link over and downward until the link assumes a horizontal position at the entrance of the chain channel or guideway.

That portion of the main frame at the juncture of the lower end of the chute H and the chain channel or guideway C' has a narrow slot, c', of just sufficient width to allow the thrust-bar V to freely play therein, and not to interfere with the link when assuming a horizontal position after leaving the channel of the chute.

By the continued revolution of the main shaft the process of successively coupling or uniting the links together is effected, the spring $q$ returning the motion of the cam T on the main shaft, the initial force being imparted by said cam to a friction-roller, $d'$, suitably connected to the pivoted lever U, as shown in Figs. 1 and 2.

After the first link is deposited longitudinally in the chain channel or guideway C', the next in the link-channel of the chute H slides down until it reaches the mouth of the hook of the previous link now in the chain-channel. A spring-guide, G', operates between the side walls, $e'$, at the lower end of the chute H, the two bottom edges, $f'$, of the guide resting on the side bars of the link astride the hook, and said guide is held down by the spring $g'$. By means of the two side walls, $e'$, the links cannot become displaced sidewise, these walls forming, as it were, a continuation of the side guides of the link-channel and being built up considerably higher than the depth of said channel, and by the employment of the spring the links cannot get out of place laterally or ride or slip over onto each other, but retain their places in the link-channel always in a straight line.

At the point where the spring-guide G' rests down upon the side bars of the link the inner sides or edges of the guide-bars $b\ c$ of the chute are cut away, as shown at $h'$, Fig. 2, to let the guide G' down onto the side bars, and also to let the link turn over the fulcrum-corner $a'$ when fed along by the thrust-bar V. As the link is thrown over and down by the thrust-bar V around the fulcrum-corner $a'$, the spring $g'$ yields for that purpose and returns in time to direct the next link down. The variable cam T on the main shaft, turning in the direction of the arrow, is adjustable on the shaft by a set-screw, so that by its irregular periphery, as shown in Fig. 10, it operates the thrust bar V at the right time and distance. As the variable cam T turns, it first brings the point $i'$ against the friction-roller $d'$ of the lever U, then still turns until the point $i''$ upon the periphery is reached, which, by the system of levers, bars, and connections, has caused the thrust-bar V to advance as far as the position shown in Fig. 4. Leaving $i''$, the cam in its movement brings the point $i'''$ in contact with the roller $d'$ at the moment the link-coupling device M forces the lowermost link in the link-channel downward into union with the link in the chain channel or guideway C'. This downward movement of the link and a slight simultaneous forward movement of the horizontal link cause the two links to come together much easier than if the horizontal link were held stationary at the time of coupling. It will be understood that during this coupling movement the hook end of the last of the assembled links is thrust against one wall of the chain-channel, (which in this machine is the lower wall,) whereby said wall is made to serve as a stop or abutment to support the hook of one of the assembled links against the thrust of the force-bar or coupling device M. While the cam T is turned over to the point $i''''$ the force-bar or coupling device M withdraws, so as not to interfere with the action of the cam moving up to $i'''''$, which causes the thrust-bar V to push the chain along a distance of one link. From $i'''''$ onward around to the starting-point—viz., $i'$—the spring $q$ causes the thrust-bar to draw back and into position ready to repeat for the next link.

It will be seen that the free end or inner end of the thrust-bar V enters the centrally-open links of the chain from the under side and engages with the hook end of the link in front of it, the spring $r$ holding the front end of the thrust-bar up to its work, but permitting it to move downward to pass first under and then up behind the last assembled link as the thrust-bar is being withdrawn or moved backward preparatory to advancing the chain one link.

The hooked end of the force-bar or coupling device M is curved or hollowed out at the lower corner, as shown at $k'$, Fig. 7, so as to not slip off the hook of the link, the spring $l'$ keeping the bar up against the stop $m'$, which stop is rigidly sustained by a bracket, H', bolted firmly to the main frame of the machine. The upper side of the lower end of the coupling device M is further shaped by double-inclined surfaces, as shown at $n'$, so as to allow it to rise on its backward stroke high enough to permit the links to slide down under it; but when thrust downward the lower inclined surface, first striking the stop $m'$, causes the lower corner to immediately drive down into the link-channel and engage the hook of the link lowermost in the link-channel and force the coupling.

It will be seen that the hook of the last of the assembled links is supported positively against the thrust of the link-coupling device, the support, stop, or abutment in this instance being one wall of the chain-guide. It will also be understood that one of the advantages which is incident to the inclined position of the feed-chute is the advancing of the uncoupled links by their own weight into proper position for being acted upon by the link-coupling device, which of course would not be the operation if the feeding-chute were in a horizontal position. Again, it is advantageous to have the chain-guide in a horizontal position, or at least at an angle to the feed-chute, because such an arrangement of parts facilitates turning the last of the assembled links into such position as will permit the coupling thereto of the lowermost of the uncoupled links by a comparatively simple mechanism.

The cam P imparts a regular intermittent movement to the adjustable rod $m$, which rod is made adjustable in length by a set-screw, or in any other well-known manner, so as to give the link-feeder Q the exact amount of travel required in order to leave the links directly under the clamp I. The chain-bar U' is also made adjustable longitudinally by set-screws or by other convenient means, so as to impart the required throw to the thrust-bar V to accommodate it to different lengths of links, and the force-bar or coupling device M in like manner is adjustable by the slotted crank j, as shown in Fig. 2, which also adjusts the throw of the push-bar N.

The guideways or bars b c can be moved from or toward each other to adapt the channel to the different widths of links, this being attained by set-screws passing through elongated slots in the guideways or bars or in any well-known manner.

The fulcrum corner or plate a' consists of a steel plate hardened, as I have found that by constant use iron will not last any length of time, this plate being secured to the side bars of the chute, and its office is, as hereinbefore stated, to throw the link over and down to a horizontal position as the chain is moved along by the thrust-bar V.

Referring to Figs. 11 and 12, W is a link connected at its upper end to crank k, and at its lower end to an elbow-lever, W', pivoted to the feed-chute H, the other arm of the lever being connected by a link to a sliding pusher, w, fitted to traverse grooved ways formed in or attached to the feed-chute. This pusher engages with the lower link in the feed-chute on a line at right angles to the feed-chute and into the mouth of the chain channel or guideway C'. In this modification the chain-channel is located in such position relative to the feed-chute that a second link can be coupled with the one just referred to by thrusting the end bar of the second link into the hook of the first-referred-to link, this modification being adapted for coupling-links by a sidewise movement, such links, for instance, as the well-known Ewart. The thrust-bar V operates to advance the completed chain link by link, as new links are added, as is done in the machine shown in the other figure. Of course this bar is located opposite to the chain-channel, and in order to provide for such changed relation of parts I propose to bend the variable chain-bar U', so as to properly connect the lever U with the adjustable lever U'', that the parts may be operated without undue friction or cramping.

w' is a rest plate or block attached to the chain-chute or an extension thereof to support the lower end of link W and one arm of the bell-crank lever W', and thus relieve the pivot $w^2$ of the lever.

$W^2$ is an adjustable stop at the lower end of the feed-chute to receive the lowermost of the descending links and insure that it shall stop in proper position for being thrust into the hook of the preceding link, which has been moved sidewise into the chain-channel C'.

I have in my Patent No. 347,338, dated August 17, 1886, shown and described the machine represented in Figs. 1 to 10, and have claimed in said patent many of the inventions which are shown and explained in this case; but I do not herein claim any of the novel features which are referred to in the claims of my said earlier patent, having based all of the claims in this case upon subject-matter which was specifically disclaimed in that patent. So, also, some of the features herein described and shown are embodied in another application of mine, Serial No. 174,962, filed August 19, 1885; hence I do not herein claim any of the features referred to in the claims of that application (No. 174,962;) but I desire to cover in this case all the patentable inventions which are shown and described herein, but are not referred to in my said earlier patent or application.

Upon an examination of the drawings and the above description it will be readily understood that the machine shown in Figs. 1 to 10, inclusive, can, by very slight structural changes, have the parts or devices shown in Figs. 11 and 12 substituted for some of the devices shown in the first-named figures, and that the machine as thus modified will contain many of the inventions covered by the annexed claims. For instance, in both constructions the machines are adapted to assemble links into a chain by thrusting the end bar of one link into the hook of the preceding link. Again, after the links are thus assembled the chain is advanced periodically in the chain-channel, so as to bring the last one of the assembled links into proper relationship with the lowermost one of the loose links which is to be coupled to the already assembled links. Again, in both machines the last of the assembled links is pushed over and downward into line with the previous link, with the throat of its hook upward to receive the lowermost of the series of uncoupled links. It will also be understood that the machine is provided with such adjustments as will enable links of different sizes to be assembled.

I claim—

1. In a machine for coupling chain-links, a feed-chute adapted to receive uncoupled chain-links, having a portion of its side walls adjustable, whereby the width of the chute may be varied to receive links of different sizes, substantially as set forth.

2. In a machine for coupling chain-links, the combination of a feed-chute adapted to receive uncoupled chain-links, a link-coupler for pushing the end bar of an uncoupled link into the hook of one of a series of assembled links, and a stop or abutment to support the hook of one of the assembled links against the thrust of the link-coupler, substantially as set forth.

3. In a machine for coupling chain-links, the combination of a feed-chute adapted to receive uncoupled chain-links, a chain-channel adapted to receive assembled links, and a link-coupler for pushing the end bar of an uncoupled link into the hook of one of the assembled links, substantially as set forth.

4. In a machine for coupling chain-links, the combination of a feed-chute adapted to receive uncoupled chain-links, a chain-channel adapted to receive assembled links, a link-coupler for pushing the end bar of an uncoupled link into the hook of one of the assembled links, and a pushing device for advancing the assembled links in the chain-channel, substantially as set forth.

5. In combination with a guideway for containing two or more assembled links, an inclined feed-chute, and a link-coupler for pushing or feeding from the latter the links placed therein, a positively-moved pusher device arranged and operating to periodically move the assembled links to the proper extent to bring the last one of the series into proper relationship with the link to be next engaged with it, substantially as set forth.

6. In a machine for coupling chain-links, the combination of a feed-chute adapted to receive uncoupled chain-links, a chain-channel adapted to contain assembled links, the feed-chute and the chain-channel being arranged at an angle to each other, a link-coupler for pushing the end bar of an uncoupled link into the hook of one of the assembled links, and a pusher device for advancing the assembled links in the chain-channel, substantially as set forth.

7. In a machine for coupling chain-links, the combination of an inclined feed-chute adapted to receive uncoupled chain-links, a horizontal chain-channel adapted to receive assembled links, a link-coupler for pushing the end of an uncoupled link into the hook of one of the assembled links, and a pusher device for advancing the assembled links in the chain-channel, substantially as set forth.

8. In a machine for coupling chain-links, the combination of a feed-chute adapted to receive uncoupled chain-links, a chain-channel adapted to receive assembled links, a link-coupler for pushing the end bar of an uncoupled link into the hook of one of the assembled links, a pivoted thrust-bar adapted to advance the assembled links in the guideway, and a spring adapted to move the swinging end of the thrust-bar into position for engagement with one of the assembled links, substantially as set forth.

9. In a machine for coupling chain-links, the combination of a chain-channel adapted to contain the assembled links, a pusher device adapted to engage with one of the assembled links, and an adjustable bar for actuating the pusher device to properly advance chain-links of different sizes, substantially as set forth.

10. In a machine for coupling chain-links, the combination of a feed-chute adapted to receive uncoupled chain-links, a chain-channel adapted to receive assembled links, a link-coupler for pushing the end bar of an uncoupled link into the hook of one of the assembled links, the plate arranged in the plane of the chain-channel, and means for advancing the assembled links in the guideway and turning the last coupled link under the plate and into line with the previous link, substantially as set forth.

In testimony whereof I affix my signature in presence of two witnesses.

NELSON B. FASSETT.

Witnesses:
GUSTAF SWENSSON,
CHAS. G. CARLSON.